United States Patent
Aoki et al.

(10) Patent No.: US 8,707,685 B2
(45) Date of Patent: Apr. 29, 2014

(54) EXHAUST GAS PURIFICATION DEVICE FOR INTERNAL COMBUSTION ENGINE

(75) Inventors: Yasumichi Aoki, Tokyo (JP); Kazuki Nishizawa, Tokyo (JP); Tomotsugu Masuda, Tokyo (JP); Kazunari Ide, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 21 days.

(21) Appl. No.: 13/388,102

(22) PCT Filed: Dec. 17, 2010

(86) PCT No.: PCT/JP2010/072751
§ 371 (c)(1),
(2), (4) Date: Apr. 3, 2012

(87) PCT Pub. No.: WO2011/078076
PCT Pub. Date: Jun. 30, 2011

(65) Prior Publication Data
US 2012/0186236 A1    Jul. 26, 2012

(30) Foreign Application Priority Data
Dec. 25, 2009  (JP) .................................. 2009-295958

(51) Int. Cl.
*F01N 3/00*   (2006.01)
*F01N 3/02*   (2006.01)
*F01N 3/08*   (2006.01)
*F01N 3/20*   (2006.01)

(52) U.S. Cl.
USPC .................... 60/295; 60/286; 60/297; 60/311

(58) Field of Classification Search
USPC .................................. 60/286, 295, 297, 311
See application file for complete search history.

(56) References Cited

U.S. PATENT DOCUMENTS

2005/0217253 A1* 10/2005 Onodera et al. ................. 60/295
2006/0000201 A1*  1/2006 Iizuka et al. .................... 60/286
(Continued)

FOREIGN PATENT DOCUMENTS

JP    2005-307778    11/2005
JP    2007-2689       1/2007
(Continued)

OTHER PUBLICATIONS

Machine Translation JP2009-62966 Done Jul. 15, 2013.*
(Continued)

*Primary Examiner* — Kenneth Bomberg
*Assistant Examiner* — Dapinder Singh
(74) *Attorney, Agent, or Firm* — Wenderoth, Lind & Ponack, L.L.P.

(57) ABSTRACT

An exhaust gas purification device for an engine has a filter in an engine exhaust passage, a diesel oxidation catalyst upstream of the filter, and a control unit which effects combustion using the catalyst to perform Active Regeneration of the filter by injecting fuel when no contribution is made to combustion in a combustion chamber when the quantity of particles collected in the filter reaches a predetermined quantity, or is less than the predetermined quantity and an elapsed time from the last filter reconditioning reaches a predetermined time. In the control unit, a mixing quantity of the fuel in oil at Active Regeneration and an evaporation quantity of the fuel from the oil are calculated, whereby a mixing ratio of the fuel in the oil is calculated, and the predetermined time or an engine operation mode is adjusted such that the mixing ratio does not exceed a prescribed control value.

8 Claims, 5 Drawing Sheets

(56) References Cited

U.S. PATENT DOCUMENTS

| | | | |
|---|---|---|---|
| 2006/0283421 A1 | 12/2006 | Chiba et al. | |
| 2008/0295491 A1* | 12/2008 | Kuboshima et al. | 60/285 |
| 2009/0064665 A1* | 3/2009 | Iizuka et al. | 60/286 |
| 2009/0082938 A1* | 3/2009 | Onodera et al. | 701/103 |
| 2009/0188236 A1* | 7/2009 | Yokota | 60/285 |
| 2009/0235644 A1* | 9/2009 | Wu et al. | 60/285 |
| 2009/0235645 A1 | 9/2009 | Noda | |
| 2009/0235647 A1* | 9/2009 | Ikeda et al. | 60/286 |
| 2010/0011750 A1* | 1/2010 | Onodera et al. | 60/287 |
| 2010/0313547 A1* | 12/2010 | Gonze et al. | 60/273 |

FOREIGN PATENT DOCUMENTS

| | | |
|---|---|---|
| JP | 2007-100595 | 4/2007 |
| JP | 2008-267287 | 11/2008 |
| JP | 2008-297969 | 12/2008 |
| JP | 2009-62966 | 3/2009 |
| JP | 2009-228589 | 10/2009 |

OTHER PUBLICATIONS

Machine Translation JP2008-267287 Done Jul. 15, 2013.*
Machine Translation JP2005-307778 Done Jul. 15, 2013.*
International Search Report issued Mar. 22, 2011 in corresponding International Application No. PCT/JP2010/072751.
International Preliminary Report on Patentability (with English translation) issued Aug. 23, 2012 in corresponding International Application No. PCT/JP2010/072751.
Decision to Grant a Patent issued Jun. 14, 2013 in corresponding Japanese Application No. 2009-295958 (with English translation).
Notice of Allowance dated Nov. 27, 2013 issued in corresponding Korean application No. 10-2011-7031253 (with English translation).

* cited by examiner

EXHAUST GAS PURIFICATION DEVICE FOR INTERNAL COMBUSTION ENGINE

TECHNICAL FIELD

The present invention relates to an exhaust gas purification device for an internal combustion engine having a filter which is provided in an exhaust passage of the internal combustion engine, collects particles in exhaust gas, and is subjected to Active Regeneration for removing the collected particles by heating, and a diesel oxidation catalyst for increasing the temperature of the filter, and particularly relates to an exhaust gas purification device for an internal combustion engine capable of controlling a mixing ratio of fuel in an engine oil such that the mixing ratio thereof is not more than a prescribed control value even when Late Post injection which injects fuel at a timing when no contribution is made to combustion in a cylinder of the internal combustion engine is performed.

BACKGROUND ART

As an exhaust gas purification device for purifying exhaust gas of a diesel engine, there is known an exhaust gas purification device which uses a DOC (Diesel Oxidation Catalyst) and a DPF (Diesel Particulate Filter) in combination.

In the exhaust gas purification device, soot in the exhaust gas is collected and discharged in the DPF. Since the DPF has the limit to the quantity of collected soot, DPF needs to be subjected to Active Regeneration by burning and removing the collected soot when the quantity of the collected soot in the DPF is within the limit quantity. The diesel oxidation catalyst provided at a stage prior to the DPF renders hydrocarbon (HC) and carbon monoxide (CO) in the exhaust gas harmless, and also has the function of oxidizing NO in the exhaust gas into $NO_2$ to burn and remove the soot collected in the DPF, and the function of increasing the temperature of the exhaust gas by using oxidation reaction heat of an unburned component in the exhaust gas when the soot collected in the DPF is subjected to the Active Regeneration.

An example of means for increasing the temperature of the exhaust gas flowing into the DPF at the time of the Active Regeneration of the DPF includes means which supplies an unburned component to the DOC installed at a stage prior to DPF to utilize oxidation heat generated in the DOC.

Examples of a method for supplying the unburned component include Late Post injection which injects fuel at a timing when no contribution is made to combustion in a cylinder of a diesel engine, and a method which directly supplies fuel to an exhaust passage from an injection device installed in an exhaust gas passage.

Such method for supplying the unburned component is disclosed in, e.g., Patent Document 1.

[Patent Document 1] Japanese Patent Application Laid-open No. 2009-228589

However, when the fuel is supplied by the Late Post injection, a part of the fuel supplied into the cylinder of the engine is not sent to the exhaust gas passage, and is mixed into an engine oil in a oil pan in the lower portion of the engine. When the mixing ratio of the fuel in the engine oil is increased, there is a possibility that the lubricity of the engine oil is reduced, or the risk of ignition resulting from a reduction in flash point (oil dilution risk) occurs.

SUMMARY OF THE INVENTION

Consequently, in view of such problem of the conventional art, an object of the present invention is to provide an exhaust gas purification device for an internal combustion engine capable of controlling the mixing ratio of the fuel in the engine oil such that the mixing ratio thereof is not more than a prescribed control value even when the Late Post injection which injects fuel at a timing when no contribution is made to combustion in the cylinder of the engine is performed at the time of the Active Regeneration of the DPF.

Means for Solving the Problem

In order to solve the above-described problem, in the present invention, there is provided an exhaust gas purification device for an engine including a filter which is provided in an exhaust passage of the engine and collects particles in exhaust gas and is subjected to Active Regeneration for burning and removing the collected particles by heating, and a diesel oxidation catalyst which is provided on an upstream side of the filter and increases a temperature of the filter, the exhaust gas purification device including a control unit which effects combustion using the diesel oxidation catalyst to perform the Active Regeneration of the filter by injecting fuel at a timing when no contribution is made to combustion in a combustion chamber of the engine when a quantity of the particles collected in the filter reaches a predetermined quantity or more, or when the quantity of the particles collected in the filter is less than the predetermined quantity and an elapsed time from the last reconditioning of the filter or a fuel supply quantity reaches a predetermined time or a predetermined quantity, the control unit including a fuel mixing quantity calculation unit which calculates a mixing quantity of the fuel mixed into an engine oil at a time of the Active Regeneration of the filter, and a fuel evaporation quantity calculation unit which calculates an evaporation quantity of the fuel from the engine oil, and a mixing ratio of the fuel in the engine oil being calculated from the mixing quantity of the fuel and the evaporation quantity of the fuel from the engine oil, and the predetermined time or an operation mode of the engine being adjusted such that the mixing ratio is not more than a prescribed control value.

By controlling the mixing ratio of the fuel in the engine oil such that the mixing ratio thereof is not more than the prescribed control value, even when Late Post injection at the time of the Active Regeneration of the filter is performed, it is possible to suppress a reduction in the lubricity of the engine oil and the risk of ignition due to a reduction in flash point which result from an increase in the mixing ratio of the fuel in the engine oil.

The control unit has an initial estimated time set therein which is an estimated time required from a start of the Active Regeneration to an end thereof, compares a time actually spent on the Active Regeneration with the initial estimated time, and may appropriately adjust the predetermined time or the operation mode of the engine when the time spent on the Active Regeneration is longer than the initial estimated time.

The initial estimated time mentioned herein is estimated and set on the basis of the capability of the engine or the DPF and the track record of the previous Active Regeneration time.

During the Active Regeneration of the filter, the mixing ratio of the fuel in the engine oil monotonously increases. As a result, when the time spent on the Active Regeneration is longer than the initial estimated time, there is a possibility that the mixing ratio of the fuel in the engine oil exceeds the control value before the elapsed time reaches the predetermined time or the quantity of the particles collected in the filter reaches the predetermined quantity. Consequently, by performing the adjustment when the time spent on the Active Regeneration is longer than the initial estimated time, it is possible to control the mixing ratio of the fuel in the engine oil such that the mixing ratio thereof does not exceed the control value.

When the quantity of the particles collected in the filter reaches the predetermined quantity or more so that the Active Regeneration of the filter is performed, the control unit may appropriately adjust the mixing ratio of the fuel such that the mixing ratio thereof is not more than the prescribed control value by performing an adjustment which increases an excess air factor in the engine.

By increasing the excess air factor in the engine, the emission quantity of the particles is suppressed. That is, when the quantity of the particles collected in the filter reaches the predetermined quantity or more so that the Active Regeneration of the filter is performed, the emission quantity of the particles is suppressed by increasing the excess air factor so that it is possible to prolong the interval from the performance of the Active Regeneration to the performance of the next Active Regeneration, and control the mixing ratio of the fuel such that the mixing ratio thereof does not exceed the control value.

When the quantity of the particles collected in the filter is less than the predetermined quantity and the elapsed time from the last reconditioning of the filter or the fuel supply quantity reaches the predetermined time or the predetermined quantity so that the Active Regeneration of the filter is performed, the control unit may appropriately adjust the mixing ratio of the fuel such that the mixing ratio thereof is not more than the prescribed control value by prolonging the predetermined time.

The fuel mixing quantity calculation unit may appropriately calculate the mixing quantity of the fuel by using a pre-prepared empirical formula for calculating the mixing quantity of the fuel based on a parameter indicative of an operation state at the time of the Active Regeneration of the filter including a pressure of a common rail for storing a pressurized fuel to be supplied to the engine.

With this arrangement, it is possible to calculate the mixing quantity of the fuel mixed into the engine oil. Note that, as the parameter, there can be used, e.g., the fuel pressure in the common rail for storing high pressure fuel to be injected into the combustion chamber of the engine, the quantity of the Late Post injection, and an exhaust gas temperature at the entrance of the diesel oxidation catalyst.

The fuel evaporation quantity calculation unit may appropriately calculate the evaporation quantity of the fuel from the engine oil by using a pre-prepared empirical formula for calculating an evaporation quantity of the engine oil based on parameters indicative of the operation state at the time of the Active Regeneration of the filter including the time spent on the Active Regeneration, a time of a normal operation of the engine when the Active Regeneration is not performed, and an ambient temperature.

With this arrangement, it is possible to easily calculate the evaporation quantity of the engine oil. Note that, as the parameters, there can be used, e.g., a temperature of an oil pan for storing the engine oil, the Active Regeneration time, the ambient temperature, and a liquid surface area/capacity ratio of the oil pan.

Effects of the Invention

As described above, according to the present invention, even when the Late Post injection which injects the fuel at the timing when no contribution is made to the combustion in the cylinder of the internal combustion engine is performed at the time of the Active Regeneration of the filter, it is possible to control the mixing ratio of the fuel in the engine oil such that the mixing ratio thereof is not more than the prescribed control value.

DETAILED DESCRIPTION OF THE INVENTION

Hereinbelow, a preferred embodiment of the present invention is illustratively described in detail with reference to the drawings. However, the scope of the present invention is not limited to dimensions, materials, shapes, and relative arrangements of constituent parts described in the embodiment unless specifically described, and the embodiment is only an explanatory example.

Embodiment

Figure 1:
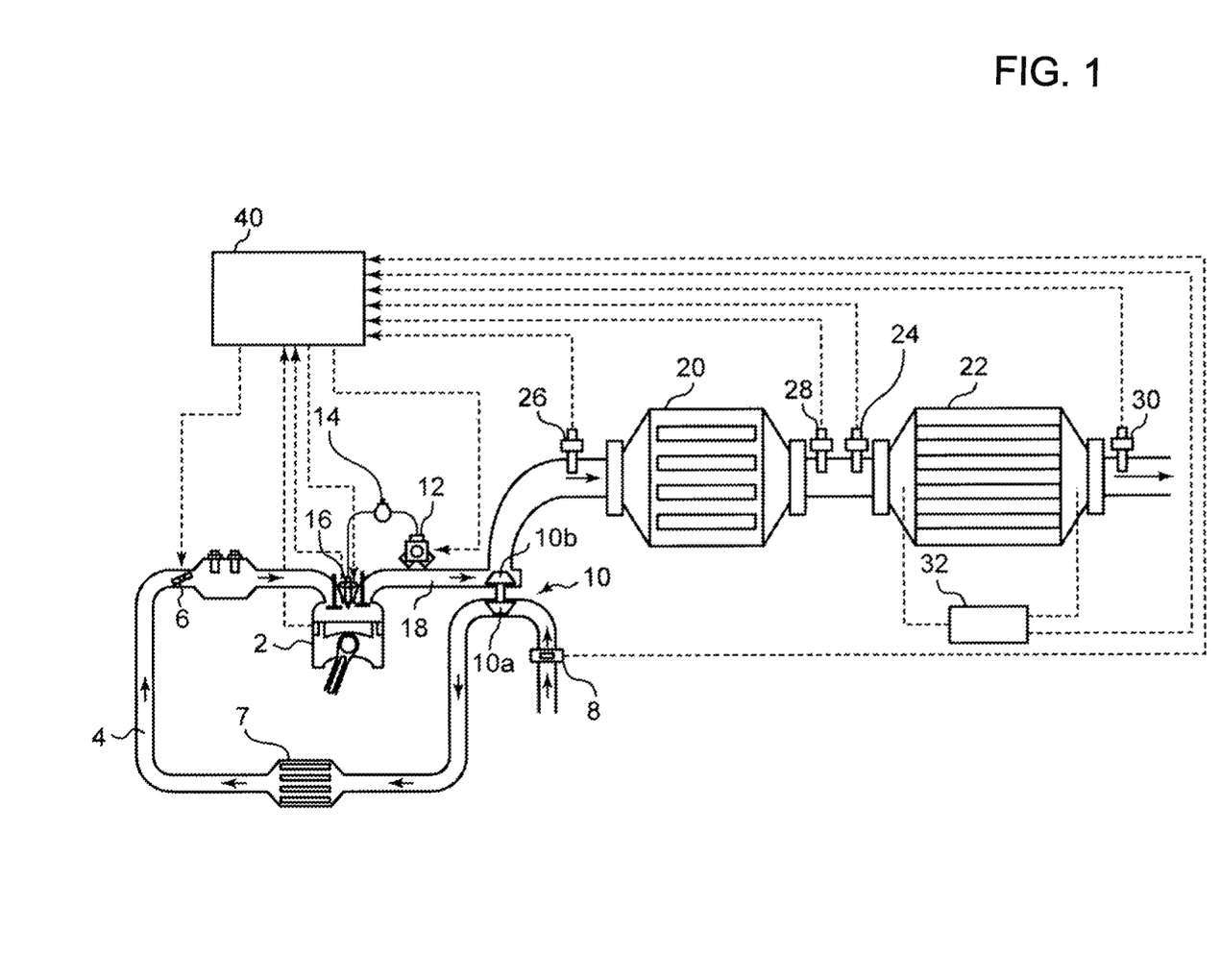
FIG. 1 is a structural view of a portion in the vicinity of an engine to which an exhaust gas purification device in an embodiment is applied.

FIG. 1 is a structural view of a portion in the vicinity of an engine to which an exhaust gas purification device in the embodiment is applied.

In an engine 2, there is provided a rotation speedometer (not shown) for detecting a rotation speed N of the engine, and the rotation speed N is captured into a control ECU 40 described later.

In addition, in the engine 2, there is provided an injector 16 for injecting fuel into a combustion chamber of the engine 2. From the injector 16, fuel stored in an oil tank (not shown) is pressurized by a high pressure pump 12, and the pressurized fuel stored in a common rail 14 is injected. A fuel injection quantity Qf of the fuel injected into the combustion chamber of the engine 2 from the injector 16 is captured into the control ECU 40.

Further, to the engine 2, an intake passage 4 and an exhaust passage 18 are connected.

In the intake passage 4, there is provided a compressor 10a of a turbocharger 10. The compressor 10a is coaxially driven by a turbine 10b described later. On the upstream side of the compressor 10a in the intake passage 4, there is provided an air flow meter 8 for detecting a sucked air flow quantity Qa of sucked air flowing in the intake passage 4, and the sucked air flow quantity Qa detected by the air flow meter 8 is captured into the control ECU 40. On the downstream side of the compressor 10a in the intake passage 4, there is provided an intercooler 7 which effects heat exchange between the sucked air flowing in the intake passage 4 and atmospheric air. In addition, on the downstream side of the intercooler 7 in the intake passage 4, there is provided a slot valve 6 for adjusting the flow quantity of the sucked air flowing in the intake passage 4.

In the exhaust passage 18, there is provided the turbine 10b of the turbocharger 10. The turbine 10b is driven by exhaust gas from the engine 2.

On the downstream side of the turbine 10b in the exhaust passage 18, there is provided a DOC 20 which renders hydrocarbon (HC) and carbon monoxide (CO) in the exhaust gas harmless by an action of an oxidation catalyst, and has the function of oxidizing NO in the exhaust gas into $NO_2$ to burn and remove soot collected in a DPF and the function of increasing the temperature of the exhaust gas by oxidation reaction heat of an unburned component in the exhaust gas when the soot collected in the DPF is subjected to Active Regeneration, and a DPF 22 which collects the soot in the exhaust gas.

In addition, in the exhaust passage 18, there are provided a pressure sensor 24 for detecting a DPF entrance pressure P_DPFin, a pressure difference sensor 32 for detecting a fore-and-aft pressure difference $\Delta P$ of the DPF, and temperature sensors 26, 28, and 30 each for detecting a temperature in the exhaust passage 18. The temperature sensor 26 detects a DOC entrance temperature T_DOCin, the temperature sensor 28 detects a DPF entrance temperature T_DPFin, and the temperature sensor 30 detects a DPF exit temperature T_DPFout. The detected values in the pressure sensor 24, the pressure difference sensor 32, and the temperature sensors 26, 28, and 30 are captured into the control ECU 40.

The control ECU 40 controls operations of the high pressure pump 12 and the injector 16 on the basis of the individual captured values described above to control the injection quantity of the fuel injected to the engine 2, and also control the quantity of the sucked air supplied to the engine 2 by adjusting the opening of the slot valve 6. In addition, the control ECU 40 controls the Active Regeneration of the DPF 22.

Figure 2:
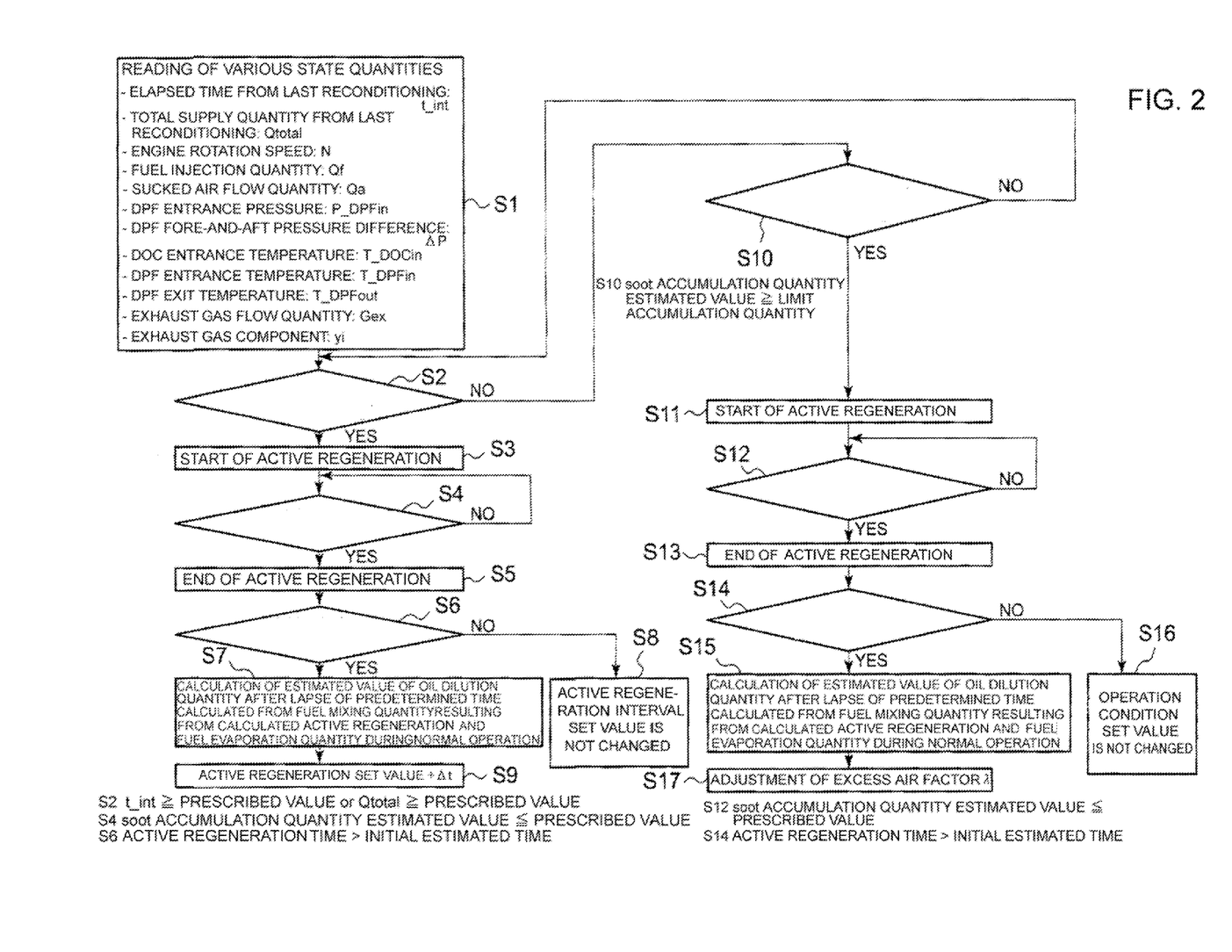
FIG. 2 is a flowchart of control at the time of DPF reconditioning.

A description is given of control at the time of the DPF reconditioning by the control ECU 40 by using FIG. 2.

FIG. 2 is a flowchart of the control at the time of the Active Regeneration of the DPF 22.

Various state quantities are read in Step S1.

In Step S1, an elapsed time t_int from the last DPF Active Regeneration until now which is calculated in the control ECU 40, a total supply quantity Qtotal from the last DPF Active Regeneration until now which is calculated in the control ECU 40 on the basis of the sucked air flow quantity Qa, the rotation speed N of the engine which is detected by the rotation speedometer provided in the engine 2, the fuel injection quantity Qf from the injector 16, the sucked air flow quantity Qa which is detected by the air flow meter 8, the DPF entrance pressure P_DPFin which is detected by the pressure sensor 24, the fore-and-aft pressure difference $\Delta P$ of the DPF which is detected by the pressure difference sensor 32, the DOC entrance temperature T_DOCin which is detected by the temperature sensor 26, the DPF entrance temperature T_DPFin which is detected by the temperature sensor 28, the DPF exit temperature T_DPFout which is detected by the temperature sensor 30, an exhaust gas flow quantity Gex, and an exhaust gas component yi are read into the control ECU 40.

In Step S2, it is determined whether or not the elapsed time t_int from the last DPF Active Regeneration until now is not less than a prescribed value, or it is determined whether or not the total supply quantity Qtotal from the last DPF Active Regeneration until now is not less than a prescribed value. When the elapsed time t_int from the last DPF Active Regeneration until now or the total supply quantity Qtotal from the last DPF Active Regeneration until now is not less than the corresponding prescribed value, the flow advances to Step S3. When both of them are less than the prescribed values, the flow advances to Step S10.

The prescribed value for performing the determination of the elapsed time t_int from the last DPF Active Regeneration until now mentioned herein is a time interval at which the Active Regeneration of the DPF 22 is forcibly started based on the lapse of the elapsed time t_int from the last DPF Active Regeneration until now, and is referred to as a Active Regeneration interval in the following description. The Active Regeneration interval is determined according to the capability of the engine 2 or the DPF 22 and the like.

In Step 10, it is determined whether or not a soot accumulation quantity estimated value is not less than a limit accumulation quantity.

The soot accumulation quantity estimated value denotes an estimated value of the quantity of the soot accumulated in the DPF 22. The soot accumulation quantity estimated value can be determined from the difference between the quantity of the soot flowing into the DPF 22 and the quantity of the soot removed by combustion during the normal operation, and the quantity of the soot flowing into the DPF 22 is calculated from the DPF entrance temperature T_DOCin, the operation state of the engine (the rotation speed N and a torque), and the exhaust gas component.

The limit accumulation quantity denotes a limit quantity of the soot which can be collected by the DPF 22.

When YES is determined in Step S10, i.e., when the soot accumulation quantity estimated value is not less than the limit accumulation quantity, the flow advances to Step S11.

When NO is determined in Step S10, i.e., when the soot accumulation quantity estimated value is less than the limit accumulation quantity, the flow returns to Step S2.

In Step S3, the Active Regeneration of the DPF 22 is started. The Active Regeneration is performed by supplying an unburned component to the DOC 20 by Late Post injection which injects fuel from the injector 6 at a timing when no contribution is made to combustion in the cylinder of the engine 2, and utilizing oxidation heat generated in the DOC 20 to increase the temperature of the exhaust gas flowing into the DPF 22.

When the Active Regeneration of the DPF 22 is started in Step S3, in Step S4, it is determined whether or not the soot accumulation quantity estimated value is not more than a prescribed value.

In Step S4, the Active Regeneration of the DPF 22 is continued until the soot accumulation quantity becomes not more than the prescribed value and, when the soot accumulation quantity becomes not more than the prescribed value, the flow advances to Step S5 to end the Active Regeneration of the DPF 22.

When the Active Regeneration of the DPF 22 is ended in Step S5, in Step S6, it is determined whether or not a Active Regeneration time is more than an initial estimated time.

The Active Regeneration time mentioned herein denotes a time actually spent from the start of the Active Regeneration in Step S3 to the end of the Active Regeneration in Step S5.

In addition, the initial estimated time denotes a pre-estimated time required from the start of the Active Regeneration to the end thereof, and is set on the basis of the capability of the engine 2 or the DPF 22 and the track record of the previous Active Regeneration time.

When NO is determined in Step S6, i.e., when the Active Regeneration time is not more than the initial estimated time, the flow advances to Step S8 to end the processing without changing the Active Regeneration interval.

When YES is determined in Step S6, i.e., when the Active Regeneration time is more than the initial estimated time, the flow advances to Step S7.

In Step S7, an estimated value of an oil dilution quantity after the lapse of a predetermined time is calculated. The oil dilution quantity mentioned herein denotes a mixing ratio of the fuel mixed into an engine oil in an oil pan for storing the engine oil in the lower portion of the engine.

The oil dilution quantity is calculated from the mixing quantity of the fuel in the engine oil resulting from the Active Regeneration of the DPF 22 and a fuel evaporation quantity during the normal operation.

The mixing quantity of the fuel in the engine oil resulting from the Active Regeneration of the DPF 22 is calculated by a fuel mixing quantity calculation unit (not shown) provided in the control ECU 40. The fuel mixing quantity calculation unit determines the fuel mixing quantity by pre-preparing an empirical formula which can estimate the fuel mixing quantity based on parameters in the Active Regeneration such as a fuel pressure in the common rail 14, a Late Post quantity, and the DOC entrance temperature T_DPCin. To the empirical formula, structural variables such as a bore, the number of injection orifices, and a swirl ratio of a fuel injection nozzle may also be added.

In addition, the fuel evaporation quantity during the normal operation is calculated by an engine oil evaporation quantity calculation unit (not shown) provided in the control ECU 40. The engine oil evaporation quantity calculation unit determines the fuel evaporation quantity during the normal operation by using a pre-prepared empirical formula similarly to the fuel mixing quantity calculation unit. In the calculation, as parameters, there can be used an oil pan temperature, the Active Regeneration time, an ambient temperature, and a liquid surface area/capacity ratio of the oil pan.

When the estimated value of the oil dilution quantity after the predetermined time is calculated in Step S7, in Step S9, in accordance with the estimated value of the oil dilution quantity after the predetermined time, the set value of the Active Regeneration interval is increased such that the actual oil dilution quantity after the predetermined time does not exceed a control value described later. The predetermined time mentioned herein denotes a time from the end of the Active Regeneration to the end of the next DPF Active Regeneration.

Figure 3:
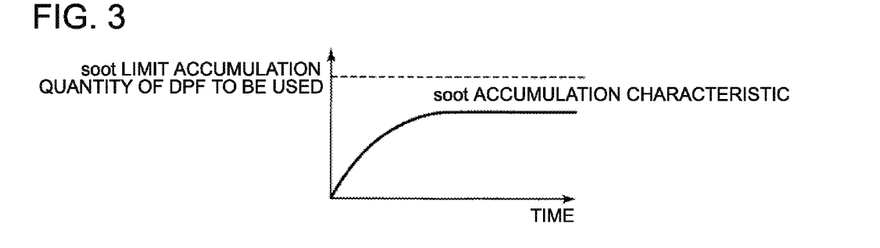
FIG. 3 is a graph showing characteristics of a soot accumulation quantity before the DPF Active Regeneration when YES is determined in Step S2 in the flowchart of FIG. 2.
Figure 4:
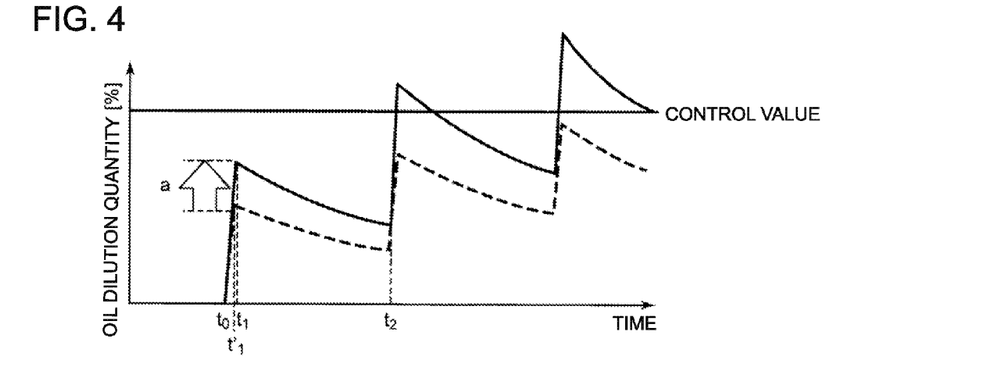
FIG. 4 is a graph showing a change with time in oil dilution quantity when YES is determined in Step S6 in the flowchart of FIG. 2 and a countermeasure is not taken thereafter.
Figure 5:
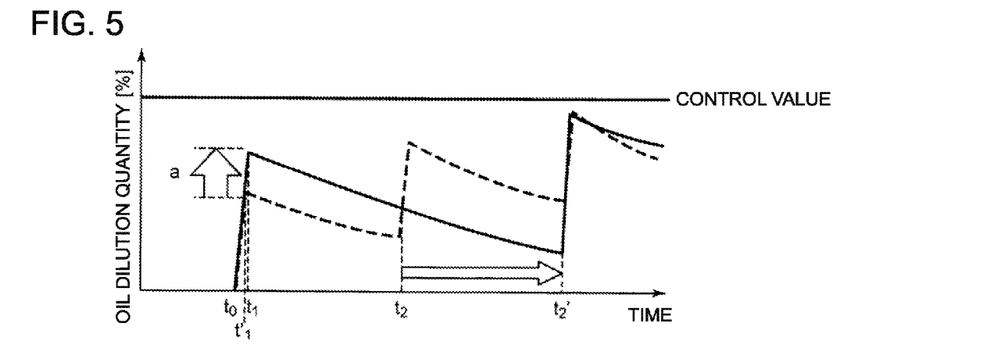
FIG. 5 is a graph showing a change with time in oil dilution quantity when YES is determined in Step S6 in the flowchart of FIG. 2 and a Active Regeneration interval is prolonged thereafter.

The increase in the set value of the Active Regeneration interval in Step S9 is described by using FIGS. 3 to 5.

FIG. 3 is a graph showing characteristics of the soot accumulation quantity before the Active Regeneration of the DPF 22 when YES is determined in Step S2 in the flowchart of FIG. 2. In FIG. 3, the vertical axis indicates the soot accumulation quantity, while the horizontal axis indicates time.

When the flow advances to Step S9, from the results of Step S2 and Step S10, the soot accumulation quantity has not reached the soot limit accumulation quantity before the Active Regeneration of the DPF 22, as shown in FIG. 3. That is, the Active Regeneration of the DPF 22 is performed at each Active Regeneration interval.

FIG. 4 is a graph showing a change with time in oil dilution quantity when YES is determined in Step S6 in the flowchart of FIG. 2 and a countermeasure is not taken thereafter. In FIG. 4, the vertical axis indicates the oil dilution quantity, while the horizontal axis indicates time. In addition, in FIG. 4, a dotted line indicates a change with time in oil dilution quantity when the Active Regeneration time corresponds to the initial estimated time, while a solid line indicates a change with time in oil dilution quantity when the Active Regeneration time is longer than the initial estimated time by $t_1-t_1'$. The oil dilution quantity monotonously increases during the Active Regeneration of the DPF 22 and monotonously decreases during the normal operation (when the Active Regeneration is not performed), and hence, in FIG. 4, the initial estimated time is represented by $t_1'-t_0$, and the Active Regeneration time is represented by $t_1-t_0$.

As the Active Regeneration time becomes longer than the initial estimated time by $t_1-t_1'$, the oil dilution quantity is increased by a every time the Active Regeneration of the DPF 22 is performed. At this point, when no countermeasure is taken, as shown in FIG. 4, there is a possibility that the oil dilution quantity exceeds the control value.

FIG. 5 is a graph showing a change with time in oil dilution quantity when YES is determined in Step S6 in the flowchart of FIG. 2 and the Active Regeneration interval is prolonged thereafter. In FIG. 5, the vertical axis indicates the oil dilution quantity, while the horizontal axis indicates time. In addition, in FIG. 5, a dotted line indicates a change with time in oil dilution quantity when the Active Regeneration time corresponds to the initial estimated time, while a solid line indicates a change with time in oil dilution quantity when the Active Regeneration time is longer than the initial estimated time.

When the Active Regeneration time is longer than the initial estimated time by $t_1-t_1'$, the Active Regeneration interval is prolonged from $t_2-t_0$ to $t_2'-t_0$, whereby the oil dilution quantity decreases between the Active Regenerations so that it is possible to control the oil dilution quantity such that the oil dilution quantity does not exceed the control value even after the next Active Regeneration of the DPF 22.

The quantity of extension of the Active Regeneration interval is set such that the oil dilution quantity does not exceed the control value even after the next Active Regeneration of the DPF 22.

When YES is determined in S10 in the flowchart of FIG. 2, i.e., when the soot accumulation quantity estimated value is not less than the limit accumulation quantity, as described above, the flow advances to Step S11.

In Step S11, the Active Regeneration of the DPF 22 is started. As described in Step S3, the Active Regeneration is performed by supplying the unburned component to the DOC 20 by the Late Post injection, and utilizing the oxidation heat generated in the DOC 20 to increase the temperature of the exhaust gas flowing into the DPF 22.

When the Active Regeneration of the DPF 22 is started in Step S11, in Step S12, it is determined whether or not the soot accumulation estimated value is not more than the prescribed value.

In Step 12, the Active Regeneration of the DPF 22 is continued until the soot accumulation quantity becomes not more than the prescribed value and, when the soot accumulation quantity becomes not more than the prescribed value, the flow advances to Step S13 to end the Active Regeneration of the DPF 22.

When the Active Regeneration of the DPF 22 is ended in Step S13, in Step S14, it is determined whether or not the Active Regeneration time is more than the initial estimated time.

When NO is determined in Step S14, i.e., when the Active Regeneration time is not more than the initial estimated time, the flow advances to Step S16 to end the processing without changing an operation condition.

When YES is determined in Step S14, i.e., when the Active Regeneration time is more than the initial estimated time, the flow advances to Step S15.

In Step S15, the estimated value of the oil dilution quantity after the lapse of the predetermined time is calculated. Similarly to Step S7, the estimated value of the oil dilution quantity is calculated from the mixing quantity of the fuel in the engine oil resulting from the Active Regeneration of the DPF 22 and the fuel evaporation quantity during the normal operation (when the reconditioning is not performed).

When the estimated value of the oil dilution quantity after the predetermined time is calculated in Step S15, in Step S17, in accordance with the estimated value of the oil dilution quantity, an excess air factor λ is adjusted such that the estimated value of the oil dilution quantity after the predetermined time does not exceed the control value. The predetermined time mentioned herein is set such that the end of the predetermined time is after the next Active Regeneration of the DPF. Note that the adjustment of the excess air factor is a part of control method change means, and is not all thereof.

Figure 8:
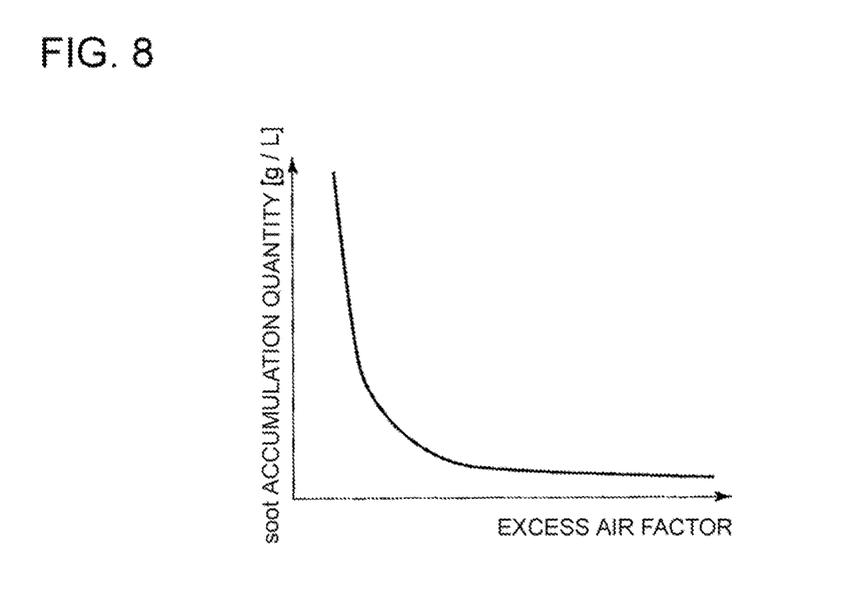
FIG. 8 is a graph showing a relationship between the soot accumulation quantity and the excess air factor.

FIG. 8 is a graph showing a relationship between the soot accumulation quantity and the excess air factor. As shown in FIG. 8, as the excess air factor increases, the soot accumulation quantity decreases.

Figure 6:
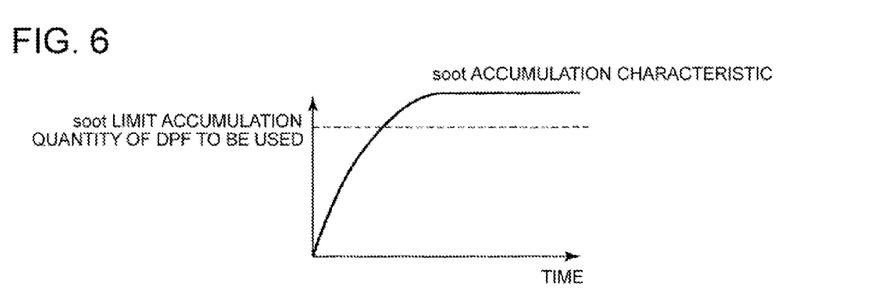
FIG. 6 is a graph showing characteristics of the soot accumulation quantity before the DFP Active Regeneration when YES is determined in Step S10 in the flowchart of FIG. 2.
Figure 7:
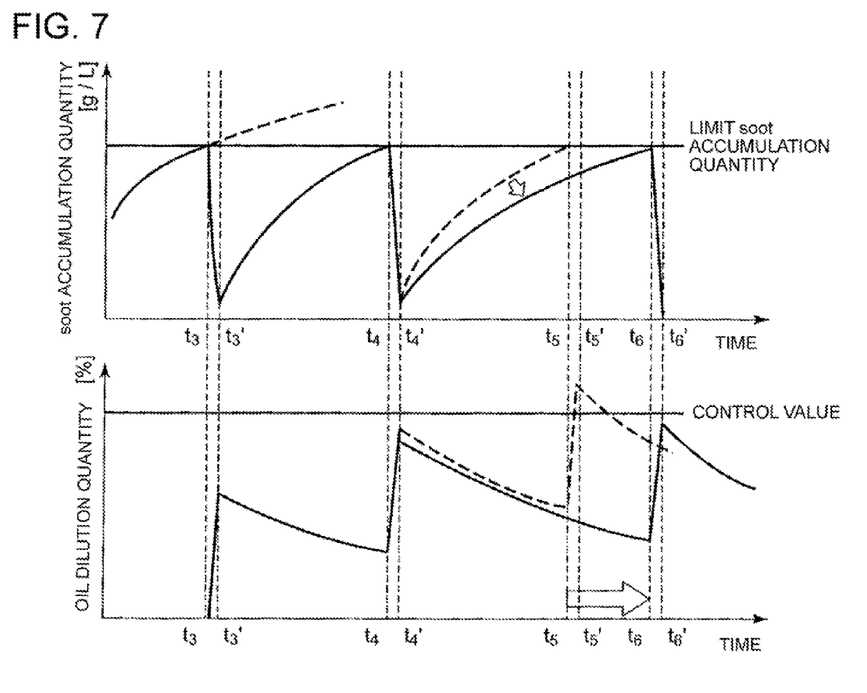
FIG. 7 shows a graph showing a change in soot accumulation quantity and a graph showing a change in oil dilution quantity when YES is determined in Step S14 in the flowchart of FIG. 2 and an excess air factor $\lambda$ is adjusted thereafter.

A description is given of the adjustment of the excess air factor λ in Step S17 by using FIGS. 6 and 7.

FIG. 6 is a graph showing characteristics of the soot accumulation quantity before the Active Regeneration of the DPF 22 when YES is determined in Step S10 in the flowchart of FIG. 2. In FIG. 3, the vertical axis indicates the soot accumulation quantity, while the horizontal axis indicates time.

When the flow advances to Step S17, from the result of Step
S10, the soot accumulation quantity reaches the soot limit accumulation quantity before the Active Regeneration of the DPF 22, as shown in FIG. 6. That is, the Active Regeneration of the DPF 22 is performed at the point when the soot accumulation quantity estimated value reaches the limit accumulation quantity.

FIG. 7 shows a graph showing a change in soot accumulation quantity and a graph showing a change in oil dilution quantity when YES is determined in Step S14 in the flowchart of FIG. 2 and the excess air factor λ is adjusted thereafter.

In the graphs shown in FIG. 7, the horizontal axis of each graph indicates time, the vertical axis of the upper graph indicates the soot accumulation quantity, and the vertical axis of the lower graph indicates the oil dilution quantity.

In FIG. 7, the soot accumulation quantity reaches the limit accumulation quantity at time $t_3$, and the Active Regeneration of the DPF 22 is performed from the time $t_3$ to time $t_3'$. By performing the Active Regeneration, the soot accumulation quantity decreases and the oil dilution quantity increases. Next, at time $t_4$, the soot accumulation quantity reaches the limit accumulation quantity, and the Active Regeneration of the DPF 22 is performed from the time $t_4$ to $t_4'$. Subsequently, after the Active Regeneration performed from the time $t_4$ to $t_4'$, as indicated by a dotted line in FIG. 7, the soot accumulation quantity is expected to reach the limit accumulation quantity at time $t_5$ and, when the Active Regeneration is performed from the time $t_5$ to $t_5'$, the oil dilution quantity is expected to exceed the control value after the Active Regeneration. At this point, by performing an adjustment which increases the excess air factor λ at the time $t_4'$ to decrease the soot accumulation quantity, as indicated by a solid line in FIG. 7, time when the soot accumulation quantity reaches the limit accumulation quantity and the Active Regeneration is started is delayed from $t_5$ to $t_6$, and the quantity of decrease of the oil dilution quantity until the next Active Regeneration is increased correspondingly so that it is possible to control the oil dilution quantity such that the oil dilution quantity does not exceed the control value even during the next Active Regeneration of the DPF performed from time $t_6$ to $t_6'$.

INDUSTRIAL APPLICABILITY

The exhaust gas purification device according to the present invention can be used as an exhaust gas purification device for an internal combustion engine capable of controlling a mixing ratio of fuel in an engine oil such that the mixing ratio thereof is not more than a prescribed control value even when Late Post injection which injects fuel at a timing when no contribution is made to combustion in a cylinder of the internal combustion engine is performed at the time of reconditioning of a filter.

The invention claimed is:

1. An exhaust gas purification device for an engine, comprising:
    a filter which is provided in an exhaust passage of the engine and collects particles in exhaust gas and is subjected to Active Regeneration for burning and removing the collected particles by heating;
    a diesel oxidation catalyst which is provided on an upstream side of the filter and increases a temperature of the filter; and
    an electronic control unit configured to effect combustion using the diesel oxidation catalyst to perform the Active Regeneration of the filter by injecting fuel at a timing when no contribution is made to combustion in a combustion chamber of the engine when a quantity of the particles collected in the filter reaches a predetermined quantity or more, or when the quantity of the particles collected in the filter is less than the predetermined quantity and an elapsed time from the last reconditioning of the filter or a fuel supply quantity reaches a predetermined time or a predetermined quantity,
    the control unit is further configured to calculate a mixing quantity of the fuel mixed into an engine oil at a time of the Active Regeneration of the filter, an evaporation quantity of the fuel from the engine oil, and a mixing ratio of the fuel in the engine oil from the mixing quantity of the fuel and the evaporation quantity of the fuel from the engine oil, and adjusts the predetermined time or an operation moue of the engine such that the mixing ratio is not more than a prescribed control value,
    when the quantity of the particles collected in the filter reaches the predetermined quantity or more so that the Active Regeneration of the filter is performed, the control unit is further configured to adjust the mixing ratio of the fuel such that the mixing ratio thereof is not more than the prescribed control value by performing an adjustment which increases an excess air factor in the engine.

2. The exhaust gas purification device for an engine according to claim 1, wherein the control unit has an initial estimated time set therein which is an estimated time required from a start of the Active Regeneration to an end thereof, compares a time actually spent on the Active Regeneration with the initial estimated time, and adjusts the predetermined time or the operation mode of the engine when the time spent on the Active Regeneration is longer than the initial estimated time.

3. The exhaust gas purification device for an engine according to claim 2, wherein, when the quantity of the particles collected in the filter is less than the predetermined quantity and the elapsed time from the last reconditioning of the filter or the fuel supply quantity reaches the predetermined time or the predetermined quantity so that the Active Regeneration of the filter is performed, the control unit adjusts the mixing ratio of the fuel such that the mixing ratio thereof is not more than the prescribed control value by prolonging the predetermined time.

4. The exhaust gas purification device for an engine according to claim 1, wherein the fuel mixing quantity calculation unit calculates the mixing quantity of the fuel by using a pre-prepared empirical formula for calculating the mixing quantity of the fuel based on a parameter indicative of an operation state at the time of the Active Regeneration of the filter including a pressure of a common rail for storing a pressurized fuel to be supplied to the engine.

5. The exhaust gas purification device for an engine according to claim 1, wherein the fuel evaporation quantity calculation unit calculates the evaporation quantity of the fuel from the engine oil by using a pre-prepared empirical formula for calculating an evaporation quantity of the engine oil based on parameters indicative of the operation state at the time of the Active Regeneration of the filter including the time spent on the Active Regeneration, a time of a normal operation of the engine when the Active Regeneration is not performed, and an ambient temperature.

6. The exhaust gas purification device for an engine according to claim 1, wherein, when the quantity of the particles collected in the filter is less than the predetermined quantity and the elapsed time from the last reconditioning of the filter or the fuel supply quantity reaches the predetermined time or the predetermined quantity so that the Active Regeneration of the filter is performed, the control unit adjusts the mixing ratio of the fuel such that the mixing ratio thereof is not more than the prescribed control value by prolonging the predetermined time.

7. The exhaust gas purification device for an engine according to claim 2, wherein the fuel mixing quantity calculation unit calculates the mixing quantity of the fuel by using a pre-prepared empirical formula for calculating the mixing quantity of the fuel based on a parameter indicative of an operation state at the time of the Active Regeneration of the filter including a pressure of a common rail for storing a pressurized fuel to be supplied to the engine.

8. The exhaust gas purification device for an engine according to claim 2, wherein the fuel evaporation quantity calculation unit calculates the evaporation quantity of the fuel from the engine oil by using a pre-prepared empirical formula for calculating an evaporation quantity of the engine oil based on parameters indicative of the operation state at the time of the Active Regeneration of the filter including the time spent on the Active Regeneration, a time of a normal operation of the engine when the Active Regeneration is not performed, and an ambient temperature.

* * * * *